July 23, 1957      G. F. HAUSMANN      2,799,990
SUPERSONIC JET DEFLECTION DEVICE
Filed Dec. 21, 1955
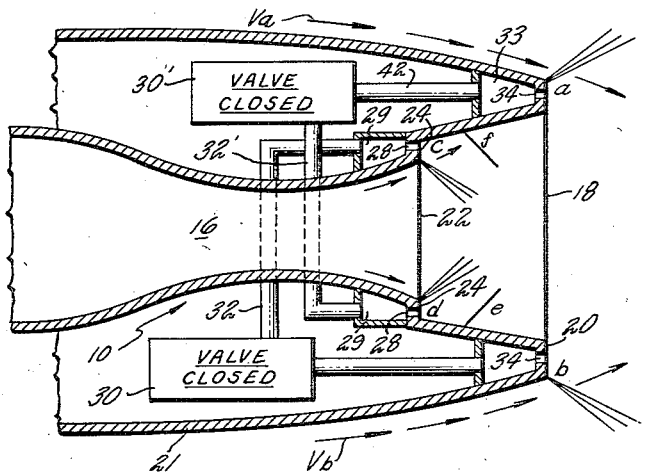
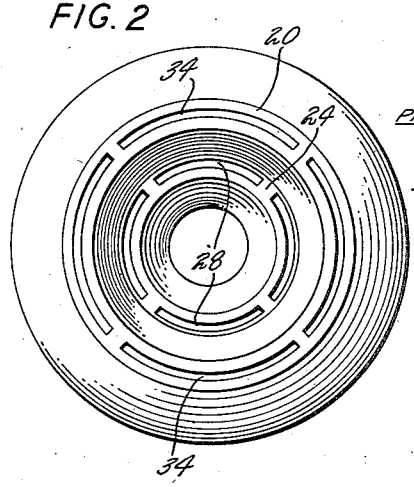
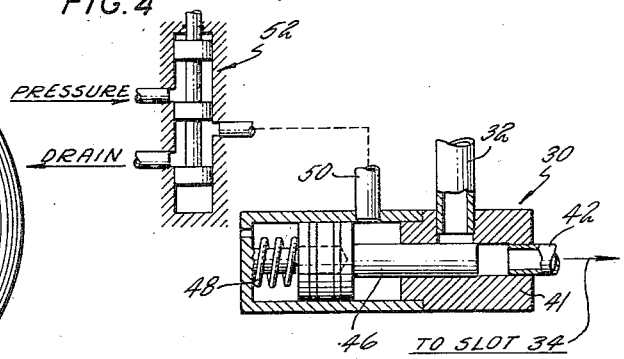
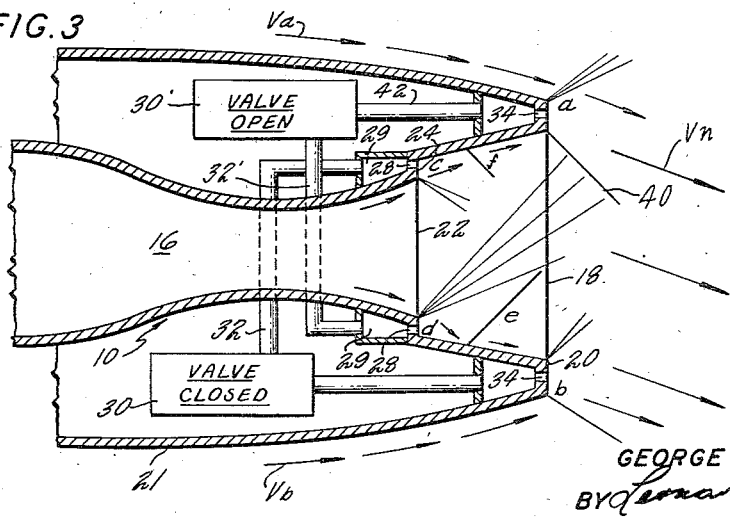
INVENTOR
GEORGE F. HAUSMANN
BY
ATTORNEY United States Patent Office 2,799,990
Patented July 23, 1957

2,799,990

SUPERSONIC JET DEFLECTION DEVICE

George F. Hausmann, Glastonbury, Conn., assignor to United Aircraft Corporation, East Hartford, Conn., a corporation of Delaware Application December 21, 1955, Serial No. 554,429

9 Claims. (Cl. 60—35.55)

This invention relates to jet deflection devices and more particularly to deflection devices for controlling the direction of a jet propelled vehicle.

It is an object of this invention to provide a simple mechanism for controlling the direction of the exhaust jet stream of a jet propelled vehicle or power plant, which power plant includes a nozzle having a supersonic stream flowing therethrough.

This and other objects of this invention will become readily apparent from the following detailed description of the drawing in which:

Fig. 1 is a schematic view in partial cross section illustrating an exhaust nozzle having a control system according to this invention.

Fig. 2 is a rear view of the Fig. 1 illustration looking in an upstream direction at the nozzle end of the vehicle.

Fig. 3 is similar to Fig. 1 but illustrates the exhaust flow deflected.

Fig. 4 is a cross-sectional schematic view of one of the control valves.

Referring to Fig. 1, an exhaust nozzle is generally indicated at 10 as having hot gases emitted through a convergent-divergent exhaust nozzle portion 16. Exhaust nozzle portion 16 terminates in an aft lip 18 which includes a substantially flat portion 20 formed at the junction of the lip 18 and the surrounding streamlined shroud 21. The flat portion 20 exists in most streamline nozzles for structural reasons. The pressure adjacent the flat surface 20 is relatively low, that is, lower than the pressure in the free stream. This low pressure is known as the base pressure. This relatively low pressure or any other source of relatively low pressure can be utilized to a good advantage in controlling the direction of the exhaust gases and subsequently any vehicle propelled by the jet exhaust. This source of low pressure is utilized to create turning forces within the exhaust nozzle.

In order to control the direction of the exhaust gases it is possible to utilize the base pressure at the face 20 or some other convenient source of low pressure. To this end an annular step 22 is formed downstream of the throat of the nozzle 16 but upstream of the aft end 18. This step forms a face 24 which lies in a plane transversely of the axis of fluid flow through the nozzle. This face 24 includes a plurality of peripherally spaced annular segmental slots 28 and corresponding segmental plenum chambers 29 with the slots 28 being better seen in Fig. 2. Each of the slots 28 is separately connected to a valve such as shown at 30, and in turn, each valve 30 is connected to a passageway such as shown at 32 which eventually terminates at annular segmental plenum chambers 33 and corresponding segmental slots 34 in the flat end surface 20 of the exhaust nozzle. These passages and slots are also shown in Figs. 2 and 3. Each segmental slot 28 is operatively connected to a diametrically opposite segmental slot 34 via each of the valves 30. The connections between slots is readily apparent in Figs. 1 and 2. Although the segmental slots 28 are herein connected to the slots 34 it should be understood that the slot 28 may be connected to other sources of low pressure as well.

As more clearly shown in Fig. 3, when one of the valves as, for example, the valve 30' is moved to an open position, one of the slots 28 in the stepped portion 22 of the nozzle 16 will be connected with its corresponding passage 32' and diametrically opposite slot 34 whereby a particular segment of step 22 is exposed to the low base pressure at 20. In this position of the valves the flow will be diverted as illustrated in Fig. 3. One valve is provided for each segmental slot 28 and 34.

With the valves 30 closed as seen in Fig. 1 the internal nozzle flow expands symmetrically around corners $c$ and $d$, and symmetrical compression is obtained through shocks $e$ and $f$. Downstream of shocks $e$ and $f$ the flow expands to the nozzle exit. The external flow indicated by arrows $V_a$ and $V_b$ expands symmetrically around the base area as shown at $a$ and $b$, respectively.

Referring to Fig. 3, when one of the valves such as 30' is opened, the pressure at base point $a$ is less than the pressure at the point $d$ of step 22 due to the internal flow expansion in the nozzle. Fluid flow at $d$ is pumped to the point $a$ thereby causing the pressure at point $d$ to become less than the pressure at the diametrically opposite point $c$, and the pressure at $a$ becomes greater than the pressure at $b$. The pressure at $f$ is lower than at $a$ and a shock wave 40 is formed from adjacent point $a$ to turn the local flow to the final vector, $V_n$. The lowering of the pressure at $d$ turns the flow through an expansion field at $d$ and subsequently a strong shock wave turns the flow along the nozzle wall at $e$. The expansion at $d$ is stronger than that at $c$ due to the corresponding lower pressure at $d$. The pressure at $e$ becomes higher than that at $b$ and the flow is turned through an expansion fan adjacent point $b$ to the final vector $V_n$. The external flow $V_a$ expands around the corner at $a$ to a direction approaching that of $V_n$ and the external flow, $V_b$, is turned by the shock wave at $b$ to the direction of final vector $V_n$.

The net result of the differential bleed on the segments of the step 22 is a redirection of the nozzle flow in the manner indicated such that a side or turning force is produced.

As seen in Fig. 4, the valves 30 may be hydraulically controlled and operated. The valve 30 has a casing 41 having a passage 42 leading from the base slot 34 which can be connected to the passage 32 leading to a segmental slot 28 of the step 22. A valve plunger 46 is reciprocable in casing 41 to connect or disconnect the passages or lines 32 and 42. The plunger 46 is urged toward a closed position by a spring 48 and is urged toward an open position by fluid under pressure from line 50. The line 50 can be connected to pressure or drain by a pilot valve generally indicated at 52.

Each of valves 30 can be connected to a separate pilot valve and manipulated at the will of a controller.

As a result of this invention, it is apparent that a simple yet useful and highly efficient, light-weight, mechanism has been provided to directionally control a vehicle which is propelled by a jet exhaust stream. Thus, in order to deflect the exhaust gases, it is not necessary to carry any large deflecting plates or other sources of pressure in the vehicle in order to obtain adequate control force.

Although only one embodiment of this invention has been illustrated and described herein, it will be apparent that various changes and modifications may be made in the construction and arrangement of the various parts without departing from the scope of this novel concept.

What it is desired by Letters Patent is:

1. An exhaust nozzle for a jet power plant, said nozzle having a convergent-divergent portion, an annular step in the inner surface of said divergent portion forming a wall transversely of the axis of said nozzle, a plurality of segmental slots in said wall, a source of relatively low pressure, a plurality of passages connecting said slots and said source, and means in said passages for selectively connecting said slots with said source.

2. An exhaust nozzle for a jet power plant, said nozzle having a convergent-divergent portion and terminating in a trailing edge, an annular step in the inner surface of said divergent portion, a plurality of passages connected to annular segments of said step and terminating in openings in said step, means for connecting said passages to said trailing edge, and means for selectively closing off said passages.

3. An exhaust nozzle for a jet power plant, said nozzle having a convergent-divergent portion and terminating in a trailing edge, an annular step in the internal surface of said divergent portion, means dividing said step into annular segments, a plurality of passages connected to said annular segments and terminating in segmental openings in said step, means for connecting said passages to said trailing edge, and means for selectively closing off said passages.

4. An exhaust nozzle for a jet power plant, said nozzle having a convergent-divergent portion and terminating in a blunt trailing edge whereby the base pressure is relatively low, an annular step in the internal surface of said divergent portion whereby the diameter of said diverging portion is suddenly enlarged, means dividing the area formed by said step into a plurality of annular segments, a slot in each of said segments, a plurality of passages connected to the slots in said annular segments, means for connecting said passages to said blunt trailing edge, and means for selectively closing off said passages comprising valves for closing off the flow of fluid from one or more of said segments to said trailing edge and causing the fluid issuing from the nozzle to be made unsymmetrical.

5. An exhaust nozzle having a convergent-divergent portion and terminating in a blunt trailing edge whereby the base pressure is relatively low, an annular step in the internal surface of said divergent portion whereby the diameter of said diverging portion is suddenly enlarged, said step including an annular surface having a plane transversely of the axis of flow through the nozzle, a plurality of openings in said surface, means dividing said surface formed by said step into a plurality of annular segments whereby portions of said openings are isolated from other portions, a plurality of passages connected to the openings of said annular segments, means for connecting said passages to said blunt trailing edge, and means for selectively closing off said passages comprising valves for closing off the flow of fluid from one or more openings of said segments to said trailing edge and causing the fluid issuing from the nozzle to be unsymmetrical.

6. An exhaust nozzle having a convergent-divergent portion and terminating in a blunt trailing edge whereby the base pressure is relatively low, an annular step in the internal surface of said divergent portion whereby the diameter of said diverging portion is suddenly enlarged, said step including an annular surface having a plane transversely of the axis of flow through the nozzle, a plurality of openings in said surface, a plurality of passages connected to said openings, means for connecting said passages to said blunt trailing edge, means for selectively closing off said passages comprising valves for closing off the flow of fluid from one or more openings to said trailing edge and causing the fluid issuing from the nozzle to be unsymmetrical, and servo means for moving said closing means.

7. An exhaust nozzle having a convergent-divergent portion and terminating in a blunt trailing edge whereby the base pressure is relatively low, an annular step in the internal surface of said divergent portion whereby the diameter of said diverging portion is suddenly enlarged, said step being located upstream of said trailing edge, said step including an annular surface having a plane transversely of the axis of flow through the nozzle, a plurality of openings in said surface, a plurality of passages connected to said openings, means for connecting said passages to said blunt trailing edge, and means for selectively closing off said passages comprising valves for closing off the flow of fluid from one or more openings of said segments to said trailing edge and causing the fluid issuing from the nozzle to be unsymmetrical.

8. An exhaust nozzle having a convergent-divergent portion and terminating in an annular blunt trailing edge whereby the base pressure is relatively low, an annular step in the internal surface of said divergent portion whereby the diameter of said diverging portion is suddenly enlarged, said step including an annular surface having a plane transversely of the axis of flow through the nozzle, a plurality of segmental openings in said surface, a plurality of passages connected to said openings, a plurality of segmental slots in said blunt trailing edge, means for connecting said passages to said slots, and means for selectively closing off said passages comprising valves for closing off the flow of fluid from one or more openings to said slots and causing the fluid issuing from the nozzle to be unsymmetrical.

9. A supersonic exhaust nozzle having a convergent-divergent portion and terminating in a blunt trailing edge whereby the base pressure is relatively low, an annular step in the internal surface of said divergent portion whereby the diameter of said diverging portion is suddenly enlarged, said step including an annular surface having a plane transversely of the axis of flow through the nozzle, a plurality of segmental openings in said surface, a plurality of passages connected to said openings, a plurality of segmental slots in said blunt trailing edge located in alignment with said openings relative to the nozzle axis, means for connecting said passages to said blunt trailing edge whereby one of said openings is connected to a diametrically opposite slot, means for selectively closing off said passages comprising valves for closing off the flow of fluid from one or more openings of said segments to said slots and causing the fluid issuing from the nozzle to be unsymmetrical, and servo means for moving said closing means.

References Cited in the file of this patent

FOREIGN PATENTS 161,402  Australia _____ May 27, 1954